US008939431B2

(12) United States Patent
Schiepp et al.

(10) Patent No.: US 8,939,431 B2
(45) Date of Patent: Jan. 27, 2015

(54) ELECTROMAGNETIC ACTUATOR

(75) Inventors: Thomas Schiepp, Seitingen-Oberflacht (DE); Jorg Burssner, Hufingen (DE)

(73) Assignee: ETO Magnetic GmbH, Stockach (DE)

( * ) Notice: Subject to any disclaimer, the term of this patent is extended or adjusted under 35 U.S.C. 154(b) by 705 days.

(21) Appl. No.: 13/142,642

(22) PCT Filed: Nov. 12, 2009

(86) PCT No.: PCT/EP2009/008045
§ 371 (c)(1), (2), (4) Date: Jun. 29, 2011

(87) PCT Pub. No.: WO2010/075909
PCT Pub. Date: Jul. 8, 2010

(65) Prior Publication Data

US 2011/0266475 A1 Nov. 3, 2011

(30) Foreign Application Priority Data

Dec. 30, 2008 (DE) ..................... 20 2008 017 033 U

(51) Int. Cl.
*F16K 31/02* (2006.01)
*H01F 7/13* (2006.01)
*H01F 7/16* (2006.01)

(52) U.S. Cl.
CPC ................ *H01F 7/13* (2013.01); *H01F 7/1607* (2013.01)
USPC ....... 251/129.19; 251/284; 335/279; 335/281

(58) Field of Classification Search
USPC ........ 251/129.15, 129.19, 284; 335/255, 261, 335/279, 281
See application file for complete search history.

(56) References Cited

U.S. PATENT DOCUMENTS

| | | | | |
|---|---|---|---|---|
| 2,407,963 | A * | 9/1946 | Persons | 335/261 |
| 2,834,570 | A * | 5/1958 | Harrison | 251/129.19 |
| 3,737,141 | A * | 6/1973 | Zeuner | 251/129.19 |
| 4,056,255 | A * | 11/1977 | Lace | 251/129.15 |
| 5,422,617 | A | 6/1995 | Brown | |
| 5,820,101 | A * | 10/1998 | Ricco | 251/129.16 |
| 6,047,718 | A * | 4/2000 | Konsky et al. | 335/265 |
| 6,279,873 | B1 * | 8/2001 | Eichendorf et al. | 251/129.19 |

(Continued)

FOREIGN PATENT DOCUMENTS

| | | | |
|---|---|---|---|
| EP | 0774764 | A2 | 5/1997 |
| EP | 1914761 | A1 | 4/2008 |

(Continued)

*Primary Examiner* — John Bastianelli
(74) *Attorney, Agent, or Firm* — Bachman & LaPointe, P.C.

(57) ABSTRACT

An electromagnetic positioning device has a long stretched out anchor plunger section as well as an anchor having an anchor body section axially continuing the latter, which in order to magnetically interact with a core unit and by energizing a stationary provided coil device is movably designed relative to the latter. The core unit is designed in such a way that it at least sectionally encompasses the anchor plunger section as well as the anchor body section with an expanded diameter relative to the anchor plunger section. The core unit is a multi-part design in the axial direction with a stationary core section, an axially movable core section and a variable core gap between the stationary and movable core section, and the movable core section and anchor are designed and joined together via a driver in such a way that, in response to energization, the movable core section moves, causing the core gap to close, and the driver drives the anchor in the axial direction.

9 Claims, 4 Drawing Sheets

(56) References Cited

U.S. PATENT DOCUMENTS

| | | | | |
|---|---|---|---|---|
| 6,450,424 | B1 * | 9/2002 | Horbelt | 251/129.19 |
| 6,619,615 | B1 * | 9/2003 | Mayr et al. | 251/129.19 |
| 6,668,772 | B2 * | 12/2003 | Muraji | 251/129.19 |
| 6,877,717 | B2 * | 4/2005 | Collins et al. | 335/279 |
| 7,049,917 | B2 * | 5/2006 | Sano et al. | 251/129.15 |
| 7,367,543 | B2 * | 5/2008 | Sisk | 251/129.19 |
| 2005/0184841 | A1 | 8/2005 | Ryuen et al. | |
| 2005/0199847 | A1 * | 9/2005 | Hatano et al. | 251/129.15 |
| 2009/0189101 | A1 * | 7/2009 | Takeda et al. | 251/129.01 |

FOREIGN PATENT DOCUMENTS

| | | | |
|---|---|---|---|
| FR | 1496822 | A | 10/1967 |
| FR | 2834378 | A1 | 7/2003 |

* cited by examiner

ELECTROMAGNETIC ACTUATOR

BACKGROUND

The present invention relates to an electromagnetic positioning device according to the preamble to the main claim.

Such a device, for example one known from German Utility Model 20 2006 011 905 of the applicant, is generally known from prior art, and discloses an anchor plunger section (suitably interacting with a positioning partner) as an axial extension of an anchor, wherein the anchor interacts with a stationary core unit as well as a stationary coil unit in such a way that an anchor movement takes place in an axial direction as a response to the energization of the coil unit (coil device).

One special challenge relating precisely to the application of the generic technology to valves or similar switching aggregates has to do with achieving a rapid response and high magnetic positioning force at the start of the switching process (i.e., when energization begins), so that correspondingly low dead times and high dynamics can be achieved for the device. So-called flat anchor systems usually allow large forces, but have the disadvantage of comparatively short usable anchor strokes.

Further known from prior art is to tangibly increase an effective stroke of an anchor using so-called feed anchors, but the disadvantage to such an approach is that, in particular immediately after energization, only a comparatively low magnetic force is generated, so that only a slow response can be correspondingly achieved.

SUMMARY OF THE INVENTION

Therefore, the object of the present invention is to improve an electromagnetic positioning device according to the preamble of the main claim with respect to both force and dynamics after energization, as well as to increase an effective stroke.

The object is achieved by the electromagnetic positioning device with the features in the main claim; advantageous further developments of the invention are described in the subclaims.

The invention initially provides that the core unit be designed in multiple parts in the axial direction, specifically that an axially movable core section be allocated to a stationary core section in such a way that a core gap exists between these sections, which is part of the magnetic circuit and can contribute to an additional force generation immediately after energization. In addition, the movable core section and anchor are joined via the driver means according to the invention in such a way that the movable core section exerts a driving force on the anchor acting in the axial direction in response to the energization and resultant closure of the core gap, thereby optimizing the dynamics and force development immediately after energization (more precisely, after energization has begun); as soon as the core gap has then closed, the anchor moves further in the axial direction in an otherwise known manner, much like a feed anchor.

As a result, this process advantageously causes a large force to act on the anchor during the phase critical for the response and dynamics immediately after energization (more precisely, after energization has been activated), driving it in the axial direction, wherein this force is generated on the one hand in the generically known manner via exposure to magnetic field lines between the anchor and core unit, but in particular is also supported by the core gap formed between the movable and stationary core section, which exerts the input force on the anchor during the closure induced via energization.

It is especially preferred in a further development to provide the driver means on the anchor plunger section (with a reduced diameter relative to a broader anchor body section), further preferred in a transitional or passage area of the anchor plunger section via another preferably cup-shaped movable core section: In this way, the transfer of force to the anchor can be initiated in an especially suitable manner, for example by providing stair- and/or ramp-shaped driver means, in addition to which production and assembly are drastically simplified: Within the framework of preferred further developments of the invention, it is provided that the anchor plunger section be furnished with a (one or multi-piece) annular shoulder, which drivingly interacts with a corresponding driver partner, for example on the movable core section, so that the force generated between the movable and stationary core section that causes the core gap to close is effectively transferred to the anchor. Additionally or alternatively, a conical or other geometrical configuration of this driver section would appear possible and expedient.

In addition, the further developments of the invention also encompass adjusting the structural realization of the electromagnetic positioning device to nearly any applications and suitably further developing it in terms of structural design, for example by limiting the stroke of the anchor by guiding it with an anchor guiding tube. The invention also encompasses transferring or enhancing the inventive idea of a divided and partially movable core for purposes of force support to include a yoke section, which equally facilitates an anchor movement and enables an application of force on the anchor.

BRIEF DESCRIPTION OF THE DRAWINGS

Additional advantages, features, and details about the invention may be gleaned from the following description of preferred exemplary embodiments, as well as based on the drawings; the latter show.

DETAILED DESCRIPTION OF THE PREFERRED EMBODIMENT(S)

In the description of the following exemplary embodiments, the same reference numbers denote identical or directly equivalent functional components, in the absence of any other explanations.

Figure 1:
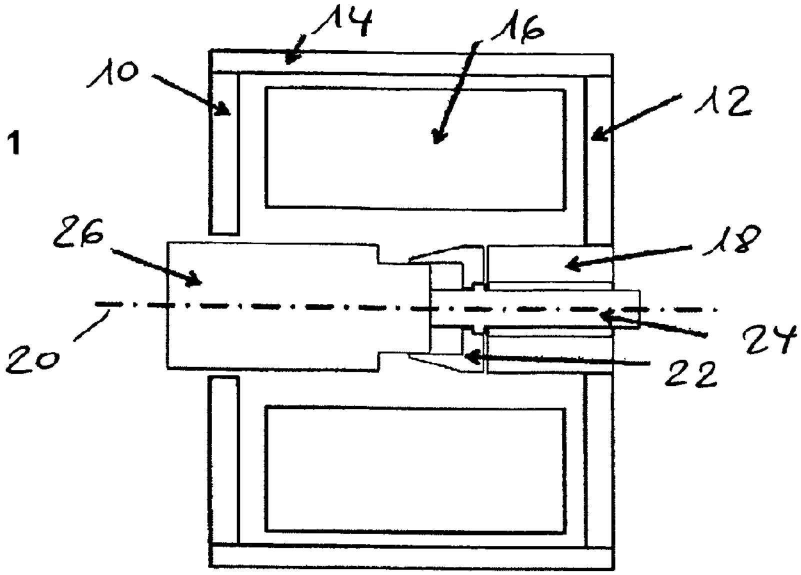
FIG. 1: A diagrammatic longitudinal section through an electromagnetic positioning device according to a first, preferred embodiment of the present invention.

For example, the schematic longitudinal section on FIG. 1 shows a view of the basic structure of the electromagnetic positioning device in the first embodiment depicted: Provided inside a housing comprised of a yoke-side housing plate 10, a core-side housing plate 12 and a cylindrical housing jacket 14 is a stationary coil unit 16, which is wired for energization in a manner not shown and otherwise known. The device further exhibits a two-part core unit comprised of a stationary core section 18 and a core unit 22 movable in the axial direction (dot-dash line 20). Guided through the core unit 18, 22 is an anchor plunger section 24, which extends in the axial direction from an anchor body section 26 having an expanded diameter.

Figure 3:
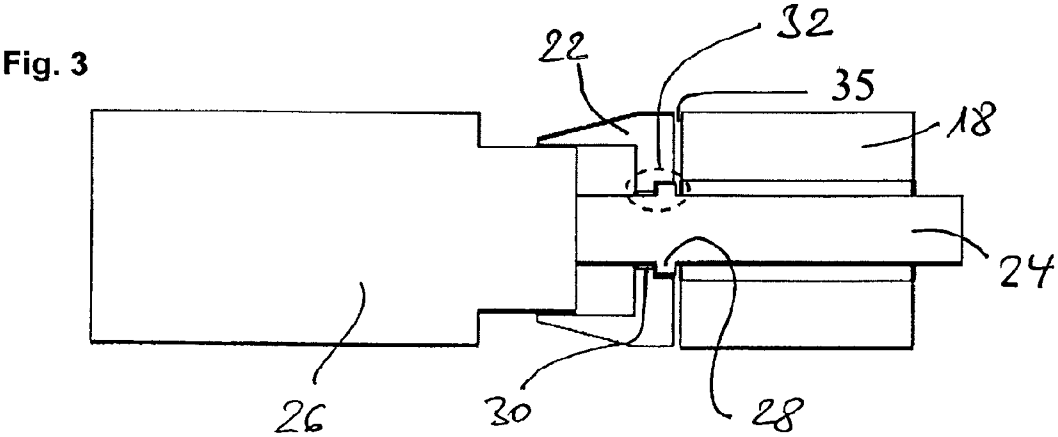
FIG. 3: A detailed view to illustrate the mechanical force transfer between the anchor and two-part core unit with these joining driver means.

Anchor plunger section 24 and movable core section 22 are also joined by means of respective annular shoulders (FIG. 3 for plunger section 24) or 30 (for the movable core section) forming a stop, and form a driver unit (driver means) denoted by the dashed border 32 on FIG. 3. In particular FIG. 3 also illustrates the core gap 34 formed in the axial direction between units 22 and 18.

Figure 2:
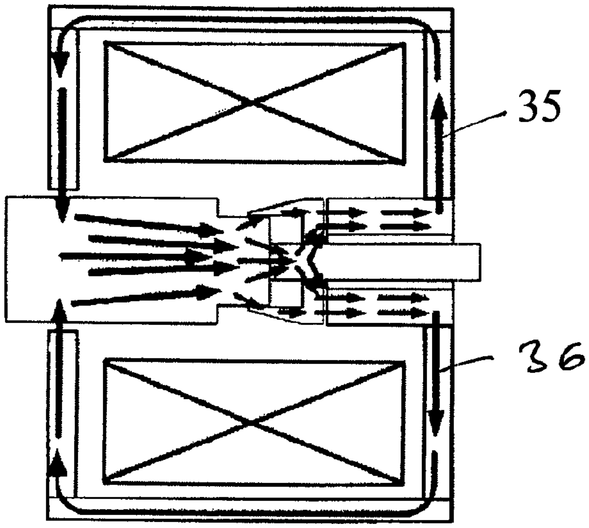
FIG. 2: A depiction similar to FIG. 1 to illustrate the magnetic force flux during energization (after energization has begun)
Figure 6:
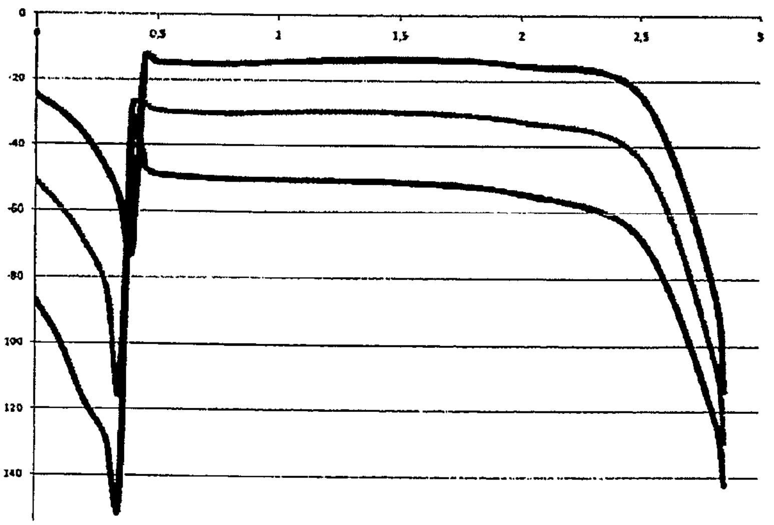
FIG. 6: A force/path diagram to illustrate the strong rise in force realized by the invention during the response or immediately after energization.
Figure 11:
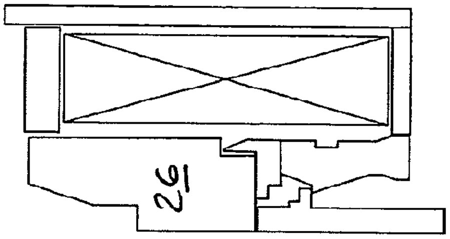
FIG. 7-FIG. 11: A sequence of five chronologically consecutive movement states following the energization of the device according to FIG. 1 to FIG. 3.
Figure 10:
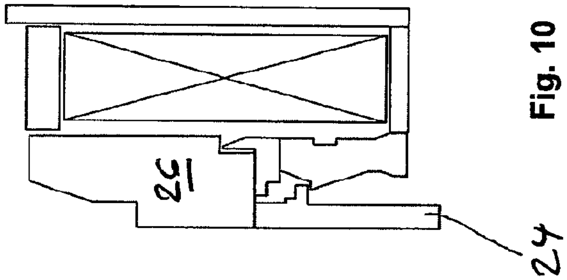
Figure 9:
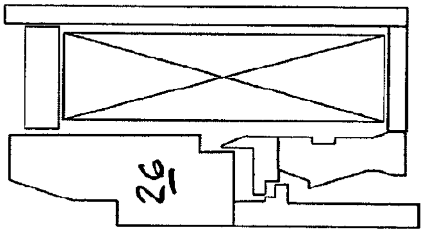
Figure 8:
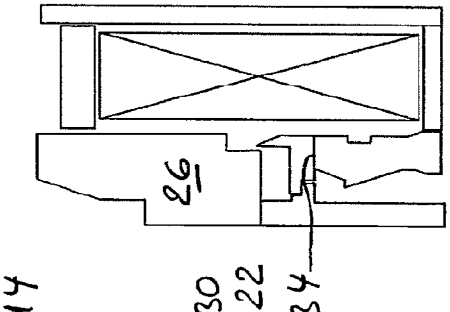
Figure 7:
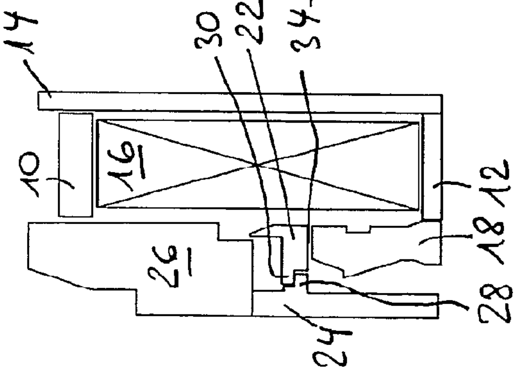

The function of the device according to FIGS. 1 to 3 is explained drawing reference to FIGS. 7 to 11, wherein FIG. 2 describes the magnetic field line progression through the components outlined in conjunction with FIG. 1 after energization: Applying the electrical signal to coil unit 16 generates a magnetic field progression corresponding to the family of arrows 35 and 36 through the surrounding housing comprised of magnetically conducting material, while a magnetic flux takes place from the anchor body section 26 into the plunger section 24, and from there into the stationary core section 18, and additionally directly via the anchor body section 26 into the movable core section 22 (by way of a narrow air gap formed in between), and then via the core gap 34 into the stationary core section 18. It is precisely this second field progression that causes a high force to act on the movable core section 24 so as to close the gap 34. The traction of the shoulders 30, 28 (driver means 32) conveys this force to the anchor plunger section 24, and hence to the entire anchor, so that a high force (and correspondingly a rapid response) is already achieved in this early phase of energization (shortly after energization or upon initiation of energization). This is illustrated on the left side of FIG. 6. Accordingly, this force leads to a closure of the gap 34 (FIG. 8, wherein FIG. 7 in this respect corresponds to the initial situation of FIG. 3), and the anchor continues moving like a conventional feed anchor (with one-part core) after the gap has closed, see FIG. 9, until reaching end-side stop positions (FIG. 10 or FIG. 11).

The remarkable aspect to this form of realization is that, atypically for a feed anchor, a very high force is already applied to the anchor immediately after energization has been activated, with a corresponding impact on the response and dynamics.

Figure 4:
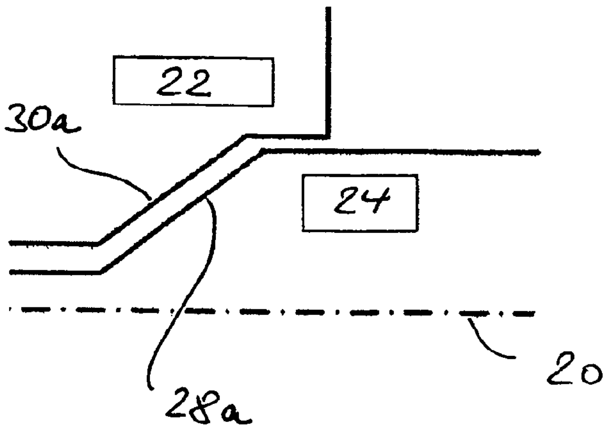
FIG. 4, FIG. 5: Two schematic diagrams for additional variants for shaping the geometry of the driver means by means of cones (FIG. 4) or multi-stage annular shoulders.
Figure 5:
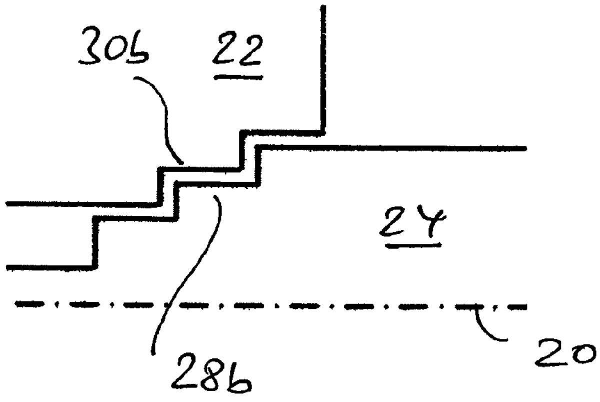

FIGS. 4 and 5 illustrate variants for the tiered formation of the driver means 32: Instead of steps 30 (for the movable core section) or 28 (for the plunger section), FIG. 4 illustrates an interacting pair of cones 28*a*, 30*a*, which similarly to the annular shoulder on FIG. 3 are designed as annular cones, and act in the depicted manner as drivers, which transfer the force causing the core gap to close to the anchor.

Accordingly, the realization of driver means sketched on FIG. 5 contains an interrelated, multi-tiered pair of annular shoulders 28*b* or 30*b*.

Figure 12:
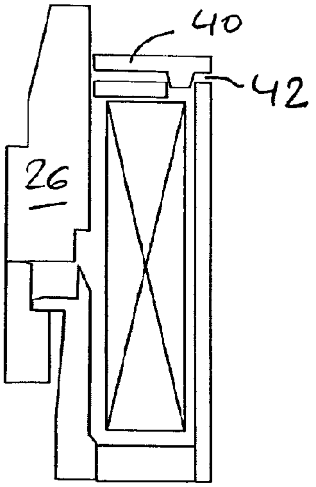
FIG. 12-FIG. 14: A depiction similar to FIG. 7 to 11 to illustrate the function and structural realization of a second embodiment of the present invention.
Figure 13:
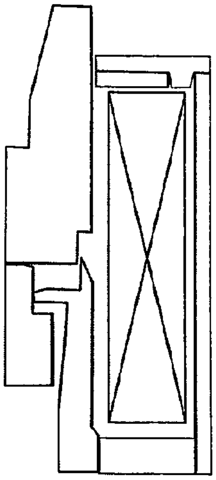
Figure 14:
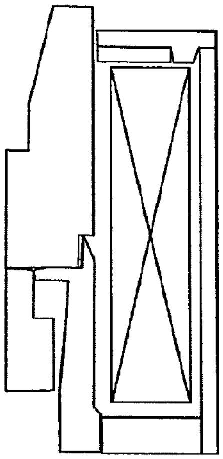

FIG. 12 to 20 illustrate further modifications of the invention: For example, the second exemplary embodiment on FIG. 12 to 14 shows the enhancement and/or replacement of the principle on FIG. 1 to 11 by a movable yoke plate 40, which is suitably coupled with the anchor, and actuated when energized to close a force-supporting gap 42, exerting a supporting force on the anchor according to the principle described above.

Figure 15:
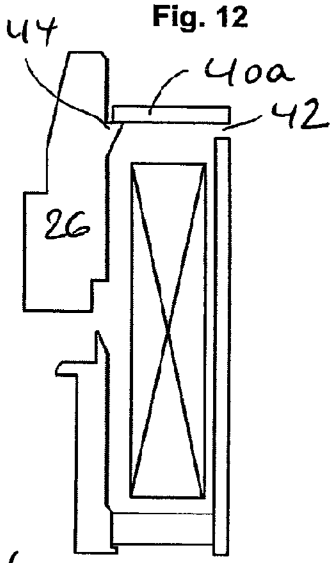
FIG. 15-FIG. 17: A depiction similar to FIG. 7 to 11 to illustrate the structural realization and function of a third embodiment of the present invention.
Figure 16:
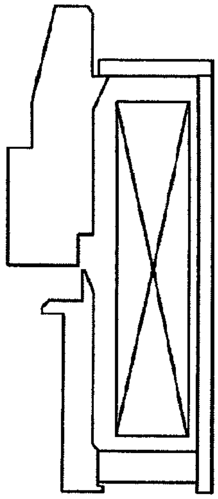
Figure 17:
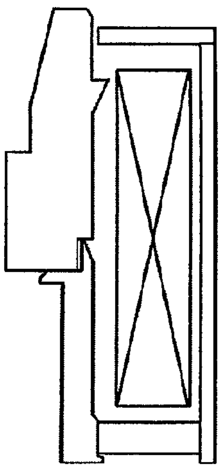

The same holds true for the modified, movable yoke plate 40*a* according to the exemplary embodiment on FIG. 15 to 17: the latter show how the movable yoke plate 40*a* directly engages an annular shoulder 44 of the anchor 26.

Figure 18:
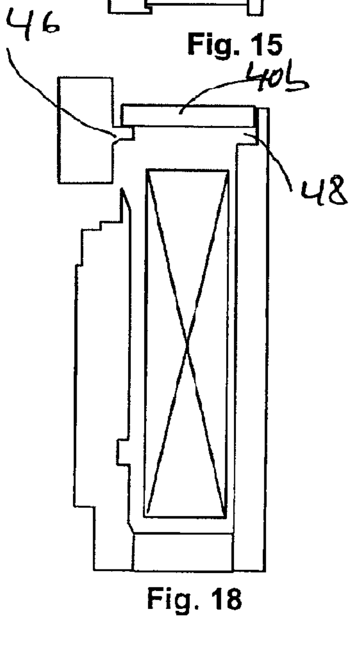
FIG. 18-FIG. 20: A depiction similar to FIG. 7 to 11 to illustrate the structural realization and function of a fourth embodiment of the present invention.
Figure 19:
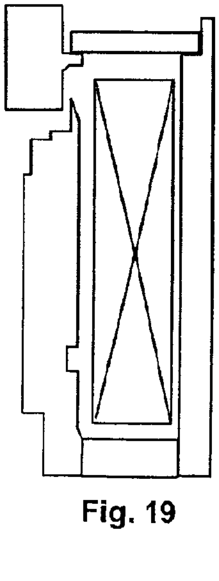
Figure 20:
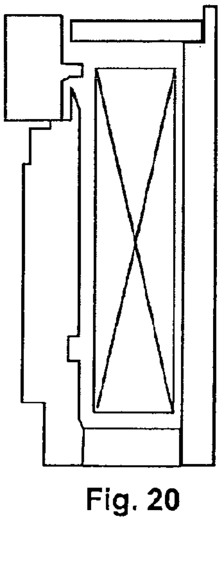

By contrast, the yoke plate 40*b* in the exemplary embodiment of FIG. 18 to 20 is held between an anchor shoulder 46 for transferring force to the anchor and a housing-side shoulder 48 for limiting the stroke of the yoke plate 40*b*.

The invention claimed is:

1. An electromagnetic positioning device comprising:

an anchor having a long stretched out anchor plunger section and an anchor body section axially continuing the anchor plunger section;

said anchor plunger section configured to magnetically interact with a core unit by energizing a stationary provided coil device and said anchor plunger section being movably designed relative to the core unit;

the core unit being designed in such a way that said core unit at least sectionally encompasses the anchor plunger section and the anchor body section with an expanded diameter relative to the anchor plunger section;

the core unit being a multi-part design in an axial direction with a stationary core section, an axially movable core section, and a variable core gap between the stationary and movable core section, the stationary core section and the movable core section both configured to magnetically interact with the anchor; and the movable core section and anchor being designed and joined together via driver means in such a way that, in response to energization, the movable core section moves, causing the core gap to close, and the driver means drive the anchor in the axial direction a yoke that interacts with the anchor body section, said yoke having a movable yoke plate and said yoke being designed in such a way that the yoke mechanically supports the driving of the anchor in response to energization.

2. A device according to claim 1, wherein the driver means are provided on the anchor plunger section.

3. A device according to claim 1, wherein the driver means exhibit an annular shoulder provided on the anchor.

4. A device according to claim 3, wherein the annular shoulder has a multi-stage design.

5. A device according to claim 1, wherein the driver means has a conical section in the form of an annular cone on the anchor.

6. A device according to claim 1, wherein the movable core section has a cup-shaped design, and is provided with an axial opening for guiding through the plunger section.

7. A device according to claim 6, wherein an outer jacket area of the movable core section has an annular conical shape.

8. A device according to claim 1, wherein the driver means on the movable core section are formed in an opening region provided for guiding through the anchor plunger section.

9. A device according to claim 8, wherein the driver means on the movable core section are configured like one of an annular shoulder and an annular cone.

* * * * *